(12) United States Patent
Barea et al.

(10) Patent No.: US 11,459,206 B2
(45) Date of Patent: Oct. 4, 2022

(54) METHOD, SYSTEM AND SENSOR FOR DETECTING A CHARACTERISTIC OF A TEXTILE OR METAL THREAD FED TO AN OPERATING MACHINE

(71) Applicant: BTSR INTERNATIONAL S.P.A., Olgiate Olona (IT)

(72) Inventors: Tiziano Barea, Busto Arsizio (IT); Michele Norgia, Milan (IT)

(73) Assignee: BTSR INTERNATIONAL S.P.A., Olgiate Olona (IT)

( * ) Notice: Subject to any disclaimer, the term of this patent is extended or adjusted under 35 U.S.C. 154(b) by 493 days.

(21) Appl. No.: 16/499,928

(22) PCT Filed: Apr. 11, 2018

(86) PCT No.: PCT/IB2018/052540
§ 371 (c)(1),
(2) Date: Oct. 1, 2019

(87) PCT Pub. No.: WO2018/193343
PCT Pub. Date: Oct. 25, 2018

(65) Prior Publication Data
US 2021/0114838 A1    Apr. 22, 2021

(30) Foreign Application Priority Data
Apr. 18, 2017   (IT) .................. 102017000042506

(51) Int. Cl.
*B65H 61/00* (2006.01)
*B65H 63/06* (2006.01)
(Continued)

(52) U.S. Cl.
CPC ......... *B65H 61/005* (2013.01); *B65H 63/065* (2013.01); *B65H 2701/31* (2013.01);
(Continued)

(58) Field of Classification Search
CPC ... G01B 11/2433; G01B 11/105; G01B 11/16; G01N 21/952; G01N 21/8915;
(Continued)

(56) References Cited

U.S. PATENT DOCUMENTS 4,974,016 A * 11/1990 Fleckenstein ........ G03D 15/046
                                              355/29
5,017,797 A *  5/1991 Uramoto ............ B65H 63/0324
                                              250/559.43
(Continued)

FOREIGN PATENT DOCUMENTS

CH        671041 A5    7/1989
EP      2423144 A2    2/2012
(Continued)

OTHER PUBLICATIONS

English machine translation of CH671041.
English machine translation of EP2423144.
English machine translation of WO0062013.

*Primary Examiner* — Sang H Nguyen
(74) *Attorney, Agent, or Firm* — Dickinson Wright PLLC; Andrew D. Dorisio

(57) ABSTRACT

A method for detecting a characteristic of a textile or metal thread fed to an operating machine, by the generation of a light signal impacting the thread to create a shadow on an optical sensor device connected to means for monitoring a characteristic of the thread on the basis of an electrical signal emitted by such sensor device as a function of the shadow generated on said sensor device by the thread itself, the characteristic being a physical characteristic of the thread such as its diameter or a characteristic of the feed of the thread when in movement, such as its speed. The signal may be detected in analog mode or a digital mode, the signal detected in the digital mode providing real time calibration of the signal detected in analog mode to generate an elec-
(Continued)

trical signal used by the monitoring means to monitor the characteristics of the thread.

15 Claims, 2 Drawing Sheets

(51) Int. Cl.
    *D02H 13/00*          (2006.01)
    *D04B 35/10*          (2006.01)
    *G01B 11/10*          (2006.01)
    *G01B 11/16*          (2006.01)
    *G01N 21/89*          (2006.01)

(52) U.S. Cl.
    CPC ............ *D02H 13/00* (2013.01); *D04B 35/10* (2013.01); *G01B 11/105* (2013.01); *G01B 11/16* (2013.01); *G01N 21/8915* (2013.01)

(58) Field of Classification Search
    CPC ............... B65H 61/005; B65H 63/065; B65H 2701/31; D01H 13/32; D01H 13/26; D02H 13/00; D04B 35/10
    See application file for complete search history.

(56) References Cited

U.S. PATENT DOCUMENTS

| | | | | |
|---|---|---|---|---|
| 5,803,334 | A * | 9/1998 | Patel | B65H 23/0204 226/45 |
| 6,219,135 | B1 | 4/2001 | Hensel et al. | |
| 6,817,170 | B2 * | 11/2004 | Eaton | D01H 13/32 57/264 |
| 7,204,137 | B1 * | 4/2007 | Skalchunes | D05B 69/36 73/159 |
| 9,347,889 | B2 * | 5/2016 | Kousalik | G01B 11/105 |
| 2004/0221912 | A1 * | 11/2004 | Buhlmann | D03D 47/34 139/169 |
| 2009/0056412 | A1 * | 3/2009 | Graeffe | D21G 9/0009 73/1.81 |
| 2009/0312957 | A1 * | 12/2009 | Domke | G01N 29/11 73/602 |
| 2014/0084101 | A1 * | 3/2014 | Barea | B65H 59/388 242/419 |
| 2016/0125238 | A1 * | 5/2016 | Enzinger | B41F 33/0081 399/16 |
| 2017/0217717 | A1 * | 8/2017 | Hiepp | B65H 63/028 |

FOREIGN PATENT DOCUMENTS

| | | |
|---|---|---|
| GB | 2159621 A | 12/1985 |
| WO | 0062013 A1 | 10/2000 |

* cited by examiner

METHOD, SYSTEM AND SENSOR FOR DETECTING A CHARACTERISTIC OF A TEXTILE OR METAL THREAD FED TO AN OPERATING MACHINE

FIELD OF THE INVENTION

The present invention relates to a method for detecting a characteristic of a textile or metal thread fed to a textile machine in accordance with the precharacterising clause of the principal claim. A system for detecting such a characteristic of the thread and operating in accordance with said method and a sensor used in such system in accordance with the corresponding independent claims also comprise the object of the present invention.

Background of the Invention

As is known, when a thread is fed to an operating machine it is normally provided that at least one characteristic of the thread, which may be dimensional or linked to the feed (such as the feed rate), is monitored by suitable sensor devices. This is so as to have an end product leaving said operating machine that has characteristics and quality in accordance with predetermined specifications.

In the present text the term "thread" is intended to mean both a textile thread or yarn and a metal thread; similarly the term "operating machine" means both a textile machine (loom, warping machine, knitting machine, interlaced winding machine, or other machine) and a machine carrying out any operation on a metal thread such as winding onto a spool.

In the present text the term "end product" means both a textile manufacture and a product containing the monitored thread, whether textile or metal (such as a bobbin).

By the term "characteristic of the thread" is meant any of its dimensional characteristics (such as diameter or fineness or local thickening or thinning), a local surface deformation (filaments or hairs projecting from the surface of the fibre), a change in the linearity of the fibre (such as winding upon itself to form a loop), or even a characteristic associated with movement of the thread such as its rate of feed to the operating machine.

Description of the Invention

Various methods and devices for determining the above-mentioned characteristic of the thread as it is fed to the operating machine are known. The present document relates to means and devices of the type mentioned which operate through using an optical system to determine said characteristic.

Devices providing for the use of optical sensors capable of checking a characteristic of the thread feed are known. Such sensors work on the basis of a physical principle of measurement comprising estimating the size of the shadow generated by the thread on the detector part of such a sensor after the thread has been "struck" by light emission generated from an illuminating device, such as an LED. On the basis of such estimate it is possible, for example, to determine the diameter of the thread or the presence of any surface irregularities or knots in it.

In the main there are two types of sensors that are currently alternatives to each other, that is sensors operating in analog mode or digital sensors (that is, in general they operate through detection of the analog type or digital type detection respectively).

Analog sensors usually comprise a photodiode onto which the shadow of the thread struck by the light generated by a LED is formed. Assuming that the illumination is planar and uniform, the amount of light measured by the sensor is proportional to the ratio between the thickness or width "d" of the shadow of the thread and the width "W" of the photodiode. FIG. 1 shows a typical photodiode S on which a shadow O of a thread F is formed; dimensions d and W and the length or height H of the photodiode are shown in that figure.

On the basis of such values the diameter d of the thread is obtained by simple proportion $$(H-d)/H = P_{MIS}/P_0$$

where $P_0$ is the power measured in the absence of the thread and $P_{MIS}$ is the power measured with the thread. This yields $$d = H(1 - P_{MIS}/P_0)$$

However analog sensors do not make highly accurate determinations and their measurements depend on many factors. For example, as far as the illumination of the thread is concerned, this must be well collimated (that is neither divergent nor convergent) so that there is no variation in the magnitude of the shadow of the thread generated on the photodiode in relation to the distance between the thread and the photodiode.

It follows, for example, that it is necessary to have a single source of light located at a great distance, something which is not however possible to achieve in most applications in which the detector device comprising the photodiode and LED must be of very small dimensions and distances between the source of light and the detector are therefore small. This is overcome through the use of special (cylindrical) lenses placed between the LED and the photodiode so as to produce at least one collimated illuminating beam in a direction at right angles to the thread, but it may also diverge in the parallel direction.

The use of compensation algorithms for the data detected by the photodiode used by a unit monitoring the aforesaid data (connected to the photodiode) may possibly also be provided, but this makes processing of such data and therefore the monitoring unit more complex and so, ultimately, all the device detecting the characteristic of the thread comprising the LED, the photodiode and said monitoring unit.

This method of estimating the diameter is simple and quick, but suffers from various accuracy problems due to the possible variability of the light source over time and lack of uniformity in space, ambient light, possible transparency of the thread, non-uniform response of the photodiode, and also errors associated with the hairiness of the thread or surface irregularities on it.

Devices which operate using digital sensors and overcome many of the problems of devices using analog sensors are also known.

As is well known, a digital approach makes it possible to overcome many of these problems. If the analog sensor is replaced by an array of sensors (typically manufactured using CMOS or CCD technology), the diameter of the thread can be estimated with greater accuracy using algorithms to determine the position of the edges of the shadow generated. Accuracy of measurement is guaranteed by the geometry of the sensor itself, with a resolution of the order of a few micrometres (pixel dimensions).

In this respect various solutions of the type indicated above in which the characteristic of the thread is measured through an array of sensors are known.

GB-2064106 describes a CCD device comprising a hundred or so optical sensors, said device being designed to analyse filiform images and being capable of determining the diameter of a thread. The shadow generated by the thread is scanned at points along the length of the CCD, that is each of the optical sensors is examined in sequence about its condition of exposure. The CCD consequently produces a sequence of pulses for each scanning cycle. The diameter of the thread is thus continuously transformed into a large number of serial pulses.

U.S. Pat. No. 4,511,253 also describes a linear array of optical sensors and a circuit for evaluating the serial signals provided by said linear array.

WO-9936746 furthermore describes a CCD sensor and a method for determining the thickness of a thread.

WO-2011147385, unlike the previous patent documents which refer to measurement means using CCD sensors, describes the preferable use of NMOS (Live MOS), JFET, LBCSAST and Scmos sensors, because their low consumption is an advantage when they are incorporated into small devices and they do not require a cooling system.

EP-1319926 describes a means intended to measure at least one property of a thread, such as for example the diameter. Here again, the optical sensor used is a CMOS sensor.

EP-2827127 describes an optical sensor comprising two parallel rows of optical elements. The optical elements in the first row are of rectangular shape and orientated in such a way as to have their long sides along the direction of movement of the projection of the thread. The optical elements in the second row are also of rectangular shape but are orientated in such a way that their long side is perpendicular to the direction of movement of the projection of the thread. In this case all the optical elements are also constructed using CMOS technology.

JP-560114704 does not refer precisely to a thread but to a cable or the like and describes the method of measuring its diameter on the basis of the width of the shadow detected by an optical sensor, the width of the shadow being constant even if the distance between the cable and the optical sensor varies.

For this specific application the main defect of this type of sensor lies in speed of measurement. In comparison with analog sensors, the number of signals which have to be acquired from an array of sensors is equal to their number of pixels. The larger the number of pixels the slower measurement of the characteristic of the thread will be in comparison with that which can be obtained using a single analog sensor. This may be overcome by connecting the digital sensors to (final) means for measurement of the monitored characteristic having very high calculation speeds (operating on the basis of the signals emitted by those sensors), but this would result in higher costs for the assembly or system so obtained. Thus the use of digital sensors generating signals which for example also correspond to tens of thousands of measurements of the diameter of a thread per second cannot be associated with the use of low cost digital electronics or microcontrollers which would otherwise make it possible to produce a detection system of acceptable cost.

GB 2159621 relates to a method and equipment for monitoring the dimensions of various products, both stationary and in movement. This prior patent text describes that a product which has to be scanned is illuminated by a laser beam and the resulting transmitted light is collected by a photocell. At the same time this product is also illuminated by another light beam in another position and the light transmitted beyond the product is collected by another photocell. The first photocell gives rise to a pulse signal which in the patent text is indicated as being digital, while the second photocell generates an analog signal; these signals are processed separately by (different) electronic circuits generating two versions of a measurement of the moving product.

The two signals are summed and the result is an analog value for accurate measurement of the diameter.

This prior document therefore describes the detection of analog data and digital data, the analog data being calibrated by the digital data. However, this detection is brought about through the use of two separate light sources at two different points on the product, which makes the known equipment described in GB 2159621 very complex and increases its size.

In addition to this, in the prior document normal illumination is used to obtain an analog measurement of the diameter of the product, and this may give rise to problems with the measurement itself because of the fact that such illumination is subject to variations which might yield erroneous values of the measured diameter.

WO 00/62013 relates to a method and equipment for measuring the diameter of transparent fibres and monitoring their surface defects. This prior document relates to measurement of the above-mentioned characteristics of optical fibres through detecting the number of interference fringes and instead does not measure the geometrical shadow generated by the product measured on a detector. Because the measurement is based on interferometry and it is the diameter of an optical fibre (transparent fibre) which is being measured, the known invention requires the use of coherent light which must necessarily be generated by a laser. Consequently, both because of the mode of operation (based on interferometry) and the means used to obtain such measurement and monitoring of the product, the known solution is very complex (also because it detects internal defects in the fibres or "air-lines") and is very costly. This solution therefore needs means to analyse the data obtained, which are quite complex and costly.

Thus the known solution cannot be used to detect the diameter of a thread in textile machines or operating machines which process textile or metal threads, because of its complexity (and therefore dimensions) and its cost.

U.S. Pat. No. 6,219,135 describes a device for optically detecting at least one parameter (such as the diameter) of a moving filamentous material. This device comprises an optical sensor having two detector parts or individual sensors, a first individual sensor operating in analog mode and a second individual sensor operating in digital mode. The thread or filamentous material moves between the optical sensor and a light source, which may also be a direct source or one capable of generating light rays that are reflected before they illuminate the thread.

The data detected by the individual sensors are processed by an evaluation circuit which generates a signal proportional to the diameter of the thread or filamentous material. Accuracy of measurement depends on the number of individual sensors used per unit length of optical sensor or whether the individual signals generated by the individual sensors are modulated (that is processed in analog mode) or only recorded in binary form (a digital signal being obtained in this way).

Also the prior document describes that by comparing the analog signals with the digital signals it is possible to obtain a value for the hairiness of the thread.

This prior document does not say anything about whether and how the data detected in analog mode and those detected in digital mode affect each other when determining the characteristic (for example the diameter) of the filamentous material being measured.

The prior document is also silent as regards product scanning times.

EP 2423144 describes a device for detecting the movement of a thread which comprises detection of the aforesaid diameter using sensors of lack of uniformity located at a distance from each other. The values determined from two sensors are compared by similarity so as to define the degree of similarity between the data detected; these degrees of similarity are then weighed against each other.

Provision is made for a delay between the signals detected by the aforesaid weighted sensors with the weighted degree of similarity, and information relating to movement of the thread is determined on the basis of this.

This solution describes the use of optical sensors to determine the speed at which the thread moves.

CH 671041 describes an electro-optical sensor device for the geometrical characteristics of the thread which uses an electro-optical sensor generating an analog signal that is digitised after filtering.

A unit for detecting Moiré defects is provided.

This prior document describes the conversion of an analog signal into a digital signal, but not calibration of the analog signal with the digital one.

The object of this invention is to provide a method and a system implementing such method and a sensor used in such a system through which the characteristics of the textile or metal thread fed to an operating machine can be determined quickly and accurately, and achieved at low cost.

In particular the object of the invention is to offer a method, a system and a sensor of the type mentioned through which one or more dimensional characteristics of the thread such as its diameter, fineness, hairiness, geometrical shape and the number of twists can be detected.

Another object is that of providing a method, a system or a sensor of the type mentioned which is capable of detecting the rate at which the thread is fed.

Another object is to provide a system of the type mentioned above which is of small dimensions such as to facilitate its use in textile machines operating with hundreds of threads at the same time.

A further object is that of providing a method, a system and a sensor of the type mentioned through which the characteristic of the thread can be measured directly using ambient light and without the need to use infrared radiation.

These and other objects which will be apparent to those skilled in the art are accomplished through a method, a system and a sensor according to the corresponding independent claims.

Brief Description of the Drawing Figures

For a better understanding of the present invention the following drawings are attached hereto purely by way of non-limiting example; in these:

Figure 1:
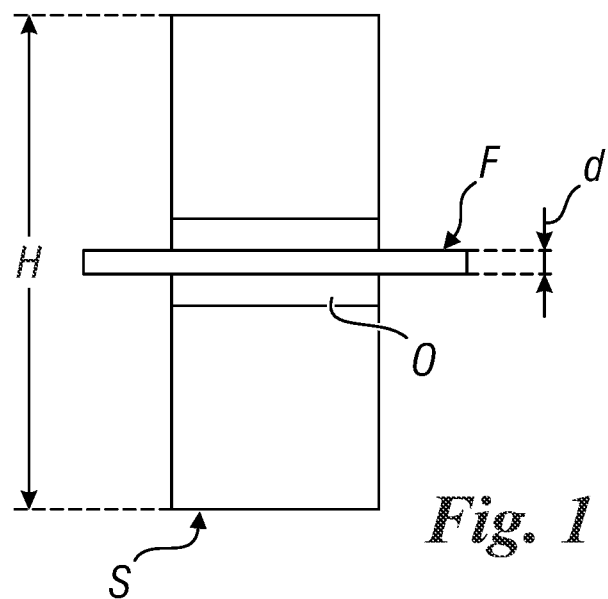
FIG. 1 shows a diagrammatical view of a known analog sensor while it is detecting a dimensional characteristic of a thread F.
Figure 2:
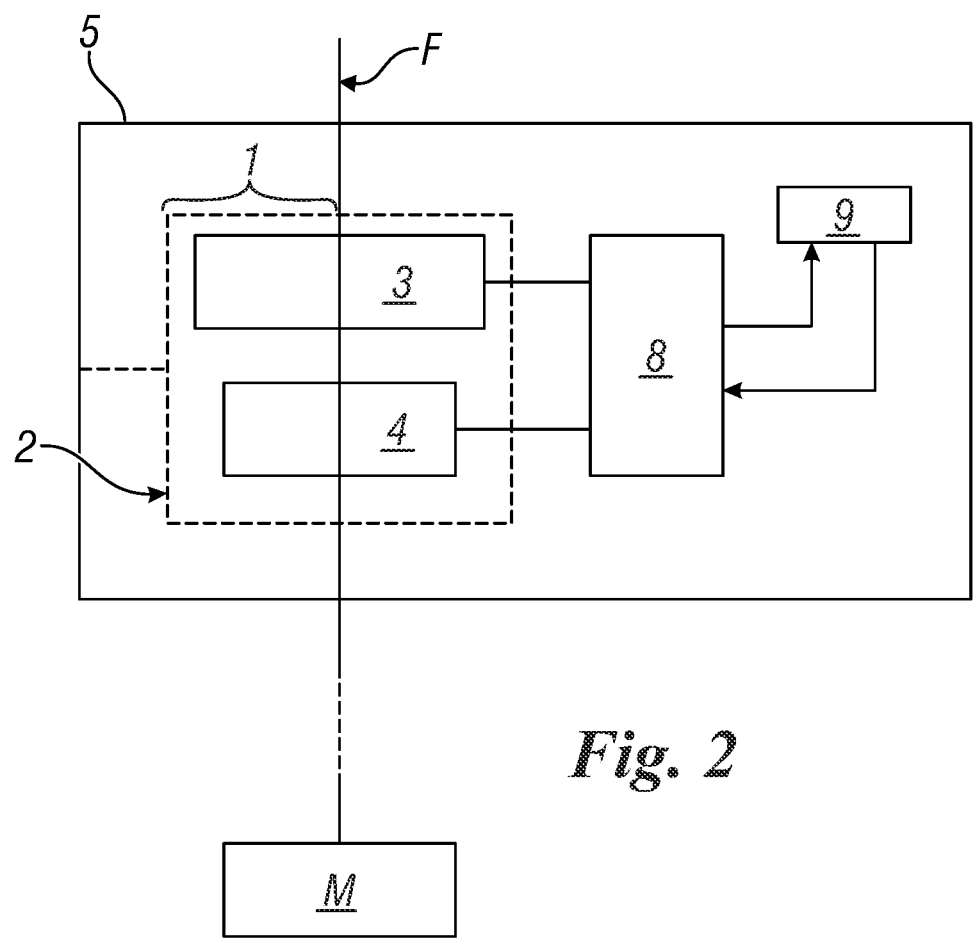
FIG. 2 shows a diagrammatical view of a system according to the invention.

With reference to the figures mentioned and FIG. 2 in particular, this shows a system 1 for detecting a characteristic of a thread F fed to an operating machine M. This thread acts together with an optical sensor 2 which in the example in the figure has an analog detection part 3 and a digital detection part 4 associated with a single container body 5 and located at a short distance between them in such body 5. This makes it possible to have a detection system 1 (or detection unit or detection device) of very small dimensions such that it can be used with other identical systems for each thread monitored in textile machines operating on hundreds of threads, such as knitting machines or the like.

Compactness of system 1 is also achieved thanks to the fact that only 1 light source or LED (not shown in FIG. 2) capable of generating light which "impacts" on thread F and allows a shadow to be generated on both of said detection parts 3 and 4 such as to allow said parts to emit electrical signals corresponding to the dimensions of such shadow upon them is also present in body 5. In particular, analog detection part 3 may be a photodiode, while part 4 may be a CMOS or CCD sensor, or a similar semiconductor sensor. Part 4 spatially digitises the shadow of the thread created thereupon, using a vectorial sensor.

The semiconductor sensors in part 4 define a matrix of photodetectors, through which the spatial digitalisation mentioned above is achieved.

Thanks to the use of these semiconductor sensors it is possible to obtain an "instantaneous photo" of the thread in a few microseconds, regardless of the speed at which the thread is being fed, as will be described below.

There is also the possibility of making an accurate determination of the diameter of such thread when moving towards a textile machine (or a winding machine for a metal thread or similar operating machine).

This accurate measurement cannot, for example, be made using the description described in WO 00/62013 in that, according to that prior document, the characteristics of the thread are measured by interferometry, as already described; as the thread is in movement and therefore vibrating, determination of the interference fringes in a way that is useful for measuring its diameter is, to say the least, imprecise.

From the shadow generated by the thread on part 4 it is possible to determine the diameter of the thread immediately without processing the signal, as takes place in WO 00/62013.

Detection parts 3 and 4 (or, for simplicity, analog sensor 3 and digital sensor 4 respectively) are connected to a monitoring or evaluation unit 8 of the microprocessor type (also present in body 5) which calculates the value of a monitored characteristic of thread F (for example, the diameter) on the basis of the electrical signals or data emitted by those parts 3 and 4. Unit 8 receives and analyses the signals originating from both sensor 3 and sensor 4.

This unit 8 is connected to a memory unit 9 into which predetermined accepted values (or monitoring parameters) for the monitored characteristics are inserted, and using these unit 8 compares the data found or actual data with them in order to evaluate how they correspond to the predetermined values; if there is no uniformity between the actual value and the value in memory, unit 8 acts in a known way, for example, by producing a visible and/or audible warning, generating a signal to a device feeding thread F to machine M or other known device, to prevent a thread F having characteristics differing from those desired from continuing to be used by machine M.

System 1 provides that the measurement made by digital part 4 of sensor 2 (which takes the form of an electrical signal) provides a real-time calibration of the measurement made in analog part 3 (which also takes the form of an electrical signal). It should be noted that the term "calibration" indicates a periodical determination of the measurement from analog part 3 of sensor 2 and comparing this measurement with the value of the diameter measured by digital part 4 of such sensor.

The "calibrated" electrical signal originating from such parts 3 and 4 is used by unit 8 to perform the evaluation indicated above.

Also considering possible errors in the analog sensor, in the short term the measurement of diameter made by such sensor or analog part 3 may also be expressed by a linear equation with the power measured by analog part 3.

$$d=H(1-C(t)\cdot P_{MIS})$$

Where $P_{MIS}$ è is the value of the power measured by analog part 3 (photodiode), a value which varies over time, H is the known dimension of analog part 3, while C is a variable (which we will define as the "calibration variable") that is a function of time and depends on various factors: the illuminating optical power, any dirt present, any transparency of the thread and any variability in the gain of the electronics (thinking of background values which vary with temperature). The value of the variable C(t) over time is evaluated at a predetermined frequency, higher than 100-150 Hz, advantageously higher than 200 Hz, preferably at 300 Hz. Through this periodical evaluation of C(t) at the sampling frequencies indicated above, factors which might have an adverse effect on the value of C(t), as indicated above, factors which vary with very much lower frequencies, can be overcome. Vice versa, the above-mentioned frequencies used to evaluate the value of C(t) at precise instances in time can be used to identify the dimensional value of the thread, in that at these frequencies the only component which can vary quickly is the transverse position of the thread itself. It has in fact been found that in practical situations the thread can move linearly or even transversely, with vibration. Because however it has been found that the vibration frequencies are at most equal to a few tens of hertz, these movements do not affect measurement if sampling is carried out at frequencies higher than 100-50 Hz; as indicated above, such vibrations therefore have no effect on the value of C(t) at the time when it is being measured.

In other words it has been found that the vibrations affecting the thread in its movement from a bobbin (from which it is unwound) to the operating machine (textile machine or machine operating on a metal thread) are of the order of at most 10 Hz. Using a sampling frequency for the signal detected of at least 100 Hz and preferably higher than 300 Hz, the image of the thread detected by analog part 3 of sensor 2 certainly shows the thread as if it were completely still and such as to allow its characteristics and in particular its diameter to be determined.

It should be noted that, as will be indicated, the signal detected by part 4 is also sampled at the same frequencies, and this also makes it possible to detect the characteristics of the thread as if it were still in the case of that digital part or sensor 4.

Unit 8 determines the value of the diameter d1 of the thread on the basis of the data detected by digital part 4 of sensor 2 (associated with the shadow generated on such part 4) at particular moments in time (and at successive and discrete timed frequencies as indicated above). Once this measurement has been made, a formula similar to that indicated above is applied and as both the dimension H of analog sensor 3 and its measured power $P_{MIS}$ are known it is possible to calculate the variability in calibration C as $$C(t)=(1-d1/H)/P_{MIS}$$

When a value of C(t) for each instant of measurement time has been obtained this can be inserted into the formula for calculating "d" using the analog sensor, bringing about calibration of the signal detected by the latter.

To conclude, if calibration parameter or variable C is calculated by means of a measurement of diameter d1 made by digital part 4 of sensor 2, at for example at least 100 Hz (or higher) the problematical effects mentioned can be compensated for (for the reasons mentioned above). This rate of measurement can be easily achieved with a CMOS sensor and low-cost electronics.

The method according to the invention therefore provides that analog part 3 of sensor 2 independently detects the characteristic (for example the diameter) of the monitored thread in a manner which is in itself known and produces its own detection signal, sending it to unit 8. The measurement by part 3 of sensor 2 is fast but, as is known, inaccurate.

In parallel, digital part 4 of sensor 2 independently and in a manner which is in itself known also detects the above-mentioned characteristic (d1) and generates its own signal sending it to unit 8. The latter, using the means described above, calibrates the signal from part 3 with the signal generated by digital part 4, a signal which is more accurate than that from the analog part, and is generated at a low sampling speed, as a result of which a microprocessor unit 8 (or "microcontroller") of very small (and commercially acceptable) dimensions and costs can be used.

On the basis of the "calibrated" signal, unit 8 acts to compare this signal with data placed in memory and if there is any difference from the latter, it generates a warning or acts in the manners indicated above.

Figure 3:
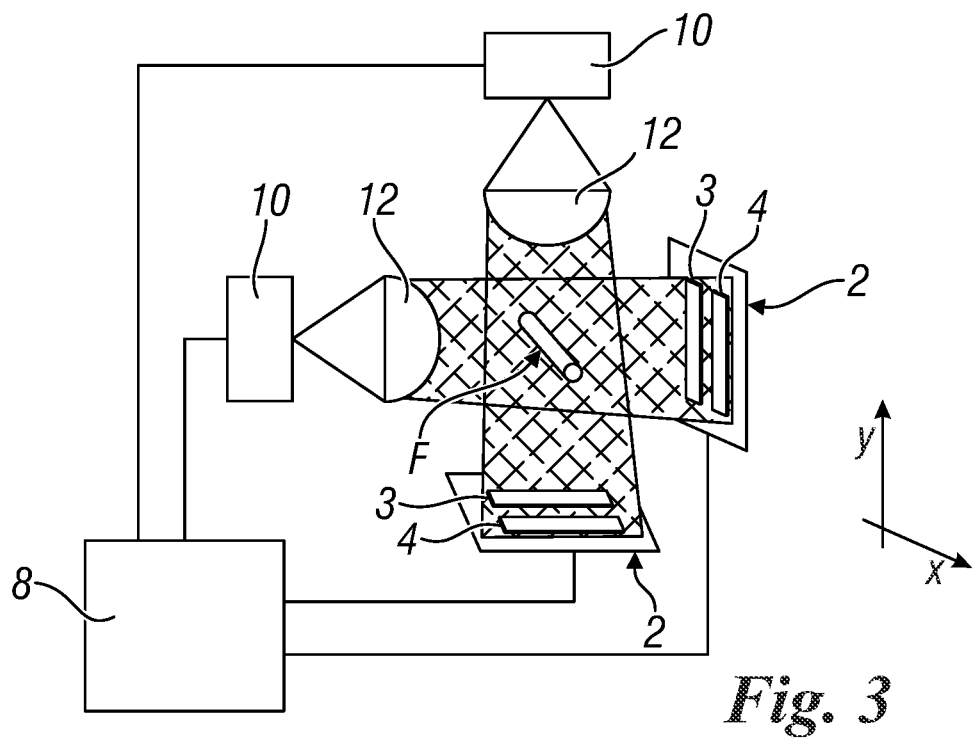
FIG. 3 shows a diagrammatical view of a first variant of the system in FIG. 2.

FIG. 3, in which parts corresponding to those in the figures already described are indicated using the same reference numbers, shows a system for measuring the fineness of a thread F, which requires two measurement axes (X and Y in FIG. 3). In this case provision is made for the use of two sensors 2, the light rays of which, generated by LED 10, are at right angles to each other. Semi-cylindrical lenses 12 which collimate the light to sensors 2 and unit 8 which is considered to include circuit 20 described above are also present in the figure. The LED are also connected to this unit 8.

These sensors 2, the LED and unit 8 are all associated with a single body 5.

A system for measuring fineness needs two measurement axes, and this can be brought about by duplicating the approach described in two dimensions. In order to avoid disturbances in ambient light the system may be pulsed, carrying out selective detection through both the photodiodes and the CMOS sensors. In order to minimise measurement times a sequence of three lighting states may be provided: light on the first axis, light on the second axis, dark. In this way, the measurement difference with respect to dark makes it possible to eliminate disturbances in ambient light without it being necessary to resort to optical filters, and it is therefore also possible to work with visible light.

One example of the use of the system in FIG. 3 is as follows. Wishing to make a measurement at 33 kHz, it is possible to produce individual light pulses having a duration of 10 μs, for an overall time of 30 μs, provided by two pulses (one per axis) and 10 μs of dark to measure the background luminosity. Two CMOS sensors of 512 pixels are sampled at 1 MHz, obtaining a sampling time of approximately 0.5 ms for an individual CMOS, and this becomes 1 ms for both of the sensors if acquired in sequence. 0.5 ms is sufficient for acquisition in parallel. The time for digital processing of the data to calculate measurement of the diameter has to be added to this time, and this is limited to approximately 2 ms for a low cost microcontroller.

In conclusion the measurement made by the two photodiodes at approximately 300 Hz can be calibrated, and this comprises a data flow at 33 kHz, quite sufficient to detect knots or defects.

In conclusion, in both the cases described (FIG. 2 and FIG. 3), rate of measurement is guaranteed by the analog sensor, while accuracy derives from the digital sensor.

Figure 4:
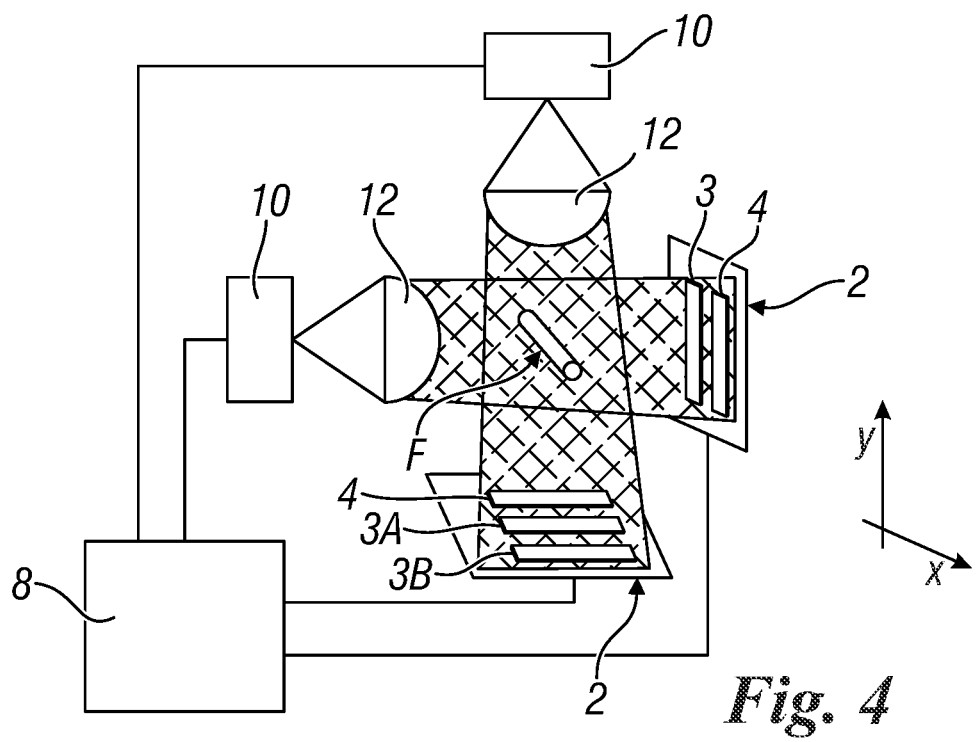
FIG. 4 shows a diagrammatical view of a second variant of the system in FIG. 2.

FIG. 4, in which parts corresponding to those in the figures already described are indicated by the same reference numbers, shows a system 1 which can also be used to determine the rate of feed of thread F along the X axis (or at right angles to the Y axis).

With regard to an embodiment of this kind, it is known that anomalies relating to a physical characteristic of a thread (for example, its diameter or fineness) are usually monitored on the basis of predetermined monitoring parameters or values such as a percentage and a length.

For example, the presence of a knot will be detected through a 50% increase in fineness over a 1 mm length of thread.

This means that a monitoring unit (such as unit 8) which checks the characteristics of the thread must operate on the basis of a suitable algorithm that is also based on knowledge of the rate at which the thread is fed so that it is possible to calculate in real time how long a detected anomaly in the thread needs to last so as to have a monitored thread length of 1 mm.

Again, in the system to which the present invention relates, it is therefore of maximum importance to be able to determine the speed of the thread as it is fed to the textile machine reliably, in real time, and as accurately as possible.

One of the advantages of being able to calculate the speed of the thread in real time is that in this way speed is no longer included in the group of parameters that have to be programmed to monitor feed of the thread to the textile machine. Also the system succeeds in keeping the monitoring threshold independent of the speed of the machine, ensuring measurement of the length needed to evaluate the anomaly in fineness and/or the diameter of the thread even during acceleration or deceleration stages or in cases where the operator changes the process speed.

The speed signal may also be used as a synchronisation signal to enable or disable monitoring, for example monitoring enabled at above 300 metres/minute.

In this way, knowledge of the speed makes the system completely independent, but it is does not require any synchronisation signal with the machine and from the machine.

According to the variant of the invention in question speed is determined by comparing the signals generated by a pair of analog parts 3A and 3B present in sensor 2 located on and operating along the X axis. Knowing the distance between said analog parts, and determining the delay in detection time for a particular characteristic of the thread (for example, a hair, a change in diameter or other characteristic) it is possible to determine the rate at which the thread is fed, using the known mathematical formula linking time, distance and speed. The most robust known technique for such determination comprises calculating the correlation function between the two analog signals, which will show a peak corresponding to the delay in detection time in the situation in which the thread has minimal surface defects.

In any event, only the data from an analog part out of the two parts 3A and 3B of sensor 2 are used to detect the characteristic of the monitored thread (according to what has been said in relation to FIGS. 2 and 3).

Various embodiments of the invention have been described. Others are however possible, such as that which provides for the use of two different sensors (always associated with a single supporting body), each having its own LED and its own detector part, a first sensor operating in analog mode (photodiode) and the other sensor in digital mode (CMOS or CCD). Again in this case, however, the signal from the "digital sensor" is used to calibrate the signal emitted by the "analog sensor" (with reference to the nature of the detector part) before the time when monitoring unit 8 determines whether the value of the monitored characteristic is acceptable (that is within predetermined parameters) or not.

These variants, which are capable of providing a sensor that can be used in a system operating in accordance with the method described to solve the technical problems mentioned above, also have the characteristics mentioned in the following claims.

The invention claimed is:

1. Method for detecting and monitoring a characteristic of a thread (F) fed to an operating machine (M), said method comprising:

detecting the characteristic of the thread (F) using an optical sensor (2) comprising both an analog sensor (3) and a digital sensor (4), and a light source (10) to illuminate the thread, said detecting step comprising a first detection of said characteristic using the analog sensor and a second detection of said characteristic using the digital sensor, the second detection allowing a digital value of the monitored characteristic to be determined, said digital value being used to calibrate an analog value of the monitored characteristic obtained in the first detection to precisely identify the definitive value of said monitored characteristic, said first detection of the characteristic and said second detection of such characteristic being performed independently, separately and generating corresponding data which are sent to a monitoring unit (8);

wherein in a first stage said monitoring unit (8) determines the digital value of the characteristic on the basis of data detected using the digital sensor (4) and calculates a calibration variable (C(t)) on the basis of said determined digital value, said calibration variable (C(t)) varying over time;

wherein in a second stage said monitoring unit (8) modifies the data detected by the analog sensor (3) on the basis of the calibration variable which is a function of such value of the characteristic determined in the second detection, said modification taking place in real time and allowing the detection of the characteristic determined in the first detection to be calibrated so as to determine the definitive value of the monitored characteristic; and wherein the monitoring unit (8) compares such definitive value of the monitored characteristic with predefined values or monitoring parameters of the monitored characteristic so as to check whether or not it corresponds to said predetermined set values; where such correspondence does not occur, said monitoring unit (8) generates a warning signal and/or acts on a feed of the thread to the operating machine to prevent a thread having a characteristic differing from the predefined set characteristic from being processed.

2. Method according to claim 1, characterised in that the calibration variable is sampled by the monitoring unit (8) at a frequency above 100-150 Hz.

3. Method according to claim 1, wherein said first and second detections are performed by illuminating the digital sensor (4) and the analog sensor with light rays laying on each of two spatial axes (X, Y) at right angles to each other, said detections with light rays on said two spatial axes being capable of being compared or crossed with each other to determine a physical characteristic of the thread (F).

4. Method according to claim 1, characterised in that the characteristic of the thread which is detected and monitored is alternatively a physical characteristic of the thread (F) or a characteristic associated with the feed of such thread (F) to a textile machine.

5. Method according to claim 4, characterised in that the physical characteristic is at least one of thread diameter (d), the fineness, the presence of local surface variations in the thread (F) itself, presence of knots along the thread, hairiness of the thread, geometrical shape of the thread, or number of twists to which the thread has been subjected.

6. Method according to claim 4, characterised in that the characteristic associated with feeding of the thread (F) to the operating machine (M) is its rate of feed.

7. Method according to claim 5, characterised in that provision is made for a sequence of three stages of illumination of the thread (F) in order to have a said first and second detection alternately on one of said axes (X, Y), one of such stages comprising the dark.

8. System according to claim 7, characterised in that alternatively said analog sensor (3) and the digital sensor (4) belong to a single optical sensor (2) or separate optical sensors (2).

9. Method according to claim 1, characterised in that provision is made for a sequence of at least two stages of illumination of the thread (F), one of such stages comprising zero illumination or dark.

10. System for detecting and monitoring a characteristic of a thread (F) fed to an operating machine (M), said system being capable of implementing the method mentioned in claim 1, the system comprising;
at least one light source;
at least one optical sensor (2) for detecting the monitored characteristic and acting together with the light source, said at least one optical sensor (2) comprising
an analog sensor (3) and
a digital sensor (4),
wherein each of said analog and digital sensor (3, 4) generates its own electrical signal corresponding to data for the monitored characteristic, wherein data for the characteristic detected by the analog sensor (3) being calibrated by the data for the characteristic detected by the digital sensor (4),
a monitoring unit (8) being functionally connected to said analog sensor (3) and to said digital sensor (4), said monitoring unit (8) being adapted for receiving and processing data for the monitored characteristic independently detected by said analog sensor (3) and said digital sensor (4), said monitoring unit (8) adapted for determining the value of the monitored characteristic as a function of data received from said analog and digital sensors (3, 4);
wherein the data received from the analog sensor (3) is calibrated by a calibration variable which varies over time, said calibration variable being defined by a value of the monitored characteristic detected by the digital sensor and determined by the monitoring unit (8), the determination of such calibration variable allowing said monitoring unit (8) to calibrate the data for the characteristic detected by the analog sensor (3) and to define the definitive value of the monitored characteristic; and
wherein said monitoring unit (8) is connected to a memory unit (9) containing predetermined values of the monitored characteristic, said monitoring unit (8) comparing the definitive value of the monitored characteristic with such predetermined values in order to generate a warning and/or to stop feed of the thread to the machine if there is a discrepancy between the definitive value of the monitored characteristic and the predetermined values.

11. Monitoring system according to claim 10, characterised in that said at least one light source is a single light source.

12. System according to claim 10, characterised in that said analog sensor (3) and said digital sensor (4), the monitoring unit (8), the memory unit (9), and the light source for said analog and digital sensors (3, 4) are parts of a single body (5), said analog and digital sensors being struck simultaneously by a shadow projected by the thread (F) when such thread is illuminated by said light source.

13. System according to claim 10, characterised in that it provides for a pair of analog sensors (3) and a pair of digital sensors (4) located on each of two axes spatially at right angles to each other (X, Y), each of such pairs acting together with a corresponding light source, the thread (F) fed to the operating machine moving between said analog sensors (3) and digital sensors (4).

14. System according to claim 13, characterised in that there are two analog sensors (3A, 3B) and one digital sensor (4) on one (X) of such spatial axes (X, Y), said analog and digital sensors being at a short distance from each other.

15. System according to claim 10, characterised in that the monitored characteristic is alternately a physical characteristic of the thread (F) such as its diameter, fineness, surface deformation, geometry, number of twists, interlacing, hairiness, or a knot, or a characteristic associated with the feed of the thread (F), that is the feed rate.

* * * * *